(12) United States Patent
Agrawal et al.

(10) Patent No.: US 10,325,372 B2
(45) Date of Patent: Jun. 18, 2019

(54) INTELLIGENT AUTO-CROPPING OF IMAGES

(71) Applicant: Amazon Technologies, Inc., Seattle, WA (US)

(72) Inventors: Amit Kumar Agrawal, Santa Clara, CA (US); Alexander Adrian Hugh Davidson, Seattle, WA (US); Prakash Ramu, San Mateo, CA (US)

(73) Assignee: Amazon Technologies, Inc., Seattle, WA (US)

( * ) Notice: Subject to any disclaimer, the term of this patent is extended or adjusted under 35 U.S.C. 154(b) by 176 days.

(21) Appl. No.: 15/385,249

(22) Filed: Dec. 20, 2016

(65) Prior Publication Data

US 2018/0174299 A1    Jun. 21, 2018

(51) Int. Cl.
     *G06T 7/194*      (2017.01)
     *G06T 7/11*      (2017.01)
     (Continued)

(52) U.S. Cl.
     CPC .............. *G06T 7/11* (2017.01); *G06K 9/4609* (2013.01); *G06K 9/6202* (2013.01); *G06T 5/50* (2013.01);
     (Continued)

(58) Field of Classification Search
     CPC ... G06T 7/11; G06T 7/90; G06T 7/194; G06T 5/50; G06T 2207/20132;
     (Continued)

(56) References Cited

U.S. PATENT DOCUMENTS

2006/0285747 A1* 12/2006 Blake ................. G06K 9/00234
     382/180
2008/0226123 A1* 9/2008 Birtwistle ............. G06T 11/001
     382/100

(Continued)

FOREIGN PATENT DOCUMENTS

JP      H11261888 A      9/1999
WO      2012015730 A1      2/2012

OTHER PUBLICATIONS

Gibbs et al., "Virtual Studios: An Overview", IEEE Multimedia, IEEE Service Center, New York, NY, US, vol. 5, No. 1, Jan. 1, 1998, pp. 18-35.

(Continued)

*Primary Examiner* — Carol Wang
(74) *Attorney, Agent, or Firm* — Kilpatrick Townsend & Stockton LLP

(57) ABSTRACT

Techniques for providing an accurate auto-crop feature for images captured by an image capture device may be described herein. For example, one or more image masks for a color image captured by an image capture device may be received by a computer system. Metadata about the color image that identifies portions of the image as foreground and the color image itself may also be received by the computer system. Further, a representation of a user and a floor region associated with a user may be extracted from the color image using the one or more image masks and the metadata. A first area of the color image may be cropped with respect to the extracted representation of the user and the floor region associated with the user to generate a second area of the color image. In embodiments, a third area of the color image may be obscured based on the received metadata.

14 Claims, 9 Drawing Sheets

(51) Int. Cl.
*G06T 5/50* (2006.01)
*G06T 7/90* (2017.01)
*G06K 9/46* (2006.01)
*G06K 9/62* (2006.01)
*H04N 13/106* (2018.01)
*H04N 13/15* (2018.01)
*H04N 13/207* (2018.01)
*H04N 13/356* (2018.01)

(52) U.S. Cl.
CPC .............. *G06T 7/194* (2017.01); *G06T 7/90* (2017.01); *H04N 13/106* (2018.05); *H04N 13/15* (2018.05); *H04N 13/207* (2018.05); *H04N 13/356* (2018.05); *G06T 2207/10012* (2013.01); *G06T 2207/10024* (2013.01); *G06T 2207/10028* (2013.01); *G06T 2207/20132* (2013.01); *G06T 2207/20221* (2013.01); *G06T 2207/20224* (2013.01); *G06T 2207/30196* (2013.01)

(58) Field of Classification Search
CPC . G06T 2207/20224; G06T 2207/10024; G06T 2207/10012; G06T 2207/20221; G06T 2207/30196; G06T 2207/10028; G06T 19/006; G06T 7/73; G06T 7/174; G06T 2215/16; H04N 13/356; H04N 13/15; H04N 13/207; H04N 13/106; G06K 9/4609; G06K 9/6202
See application file for complete search history.

(56) References Cited

U.S. PATENT DOCUMENTS

| | | | |
|---|---|---|---|
| 2011/0150337 A1* | 6/2011 | Lai | G06K 9/00234 382/190 |
| 2012/0254369 A1* | 10/2012 | Gillard | H04N 21/25891 709/219 |
| 2013/0069980 A1 | 3/2013 | Hartshorne et al. | |
| 2013/0120442 A1* | 5/2013 | Dhawan | G06T 3/0012 345/629 |
| 2013/0314402 A1* | 11/2013 | Furumura | G03B 35/02 345/419 |
| 2015/0154453 A1* | 6/2015 | Wilf | G06K 9/00711 382/103 |
| 2015/0199816 A1* | 7/2015 | Freeman | G06K 9/00362 345/633 |
| 2016/0335789 A1* | 11/2016 | Zhang | G06T 11/60 |
| 2017/0287137 A1* | 10/2017 | Lin | G06K 9/66 |

OTHER PUBLICATIONS

Heid, "The Black Art of Bluescreening: How to Combine Video Footage without Getting the Blues", Macworld, May 1, 1998, pp. 111-114.

PCT/US2017/067110, "International Search Report and Written Opinion", dated Apr. 16, 2018, 13 pages.

* cited by examiner

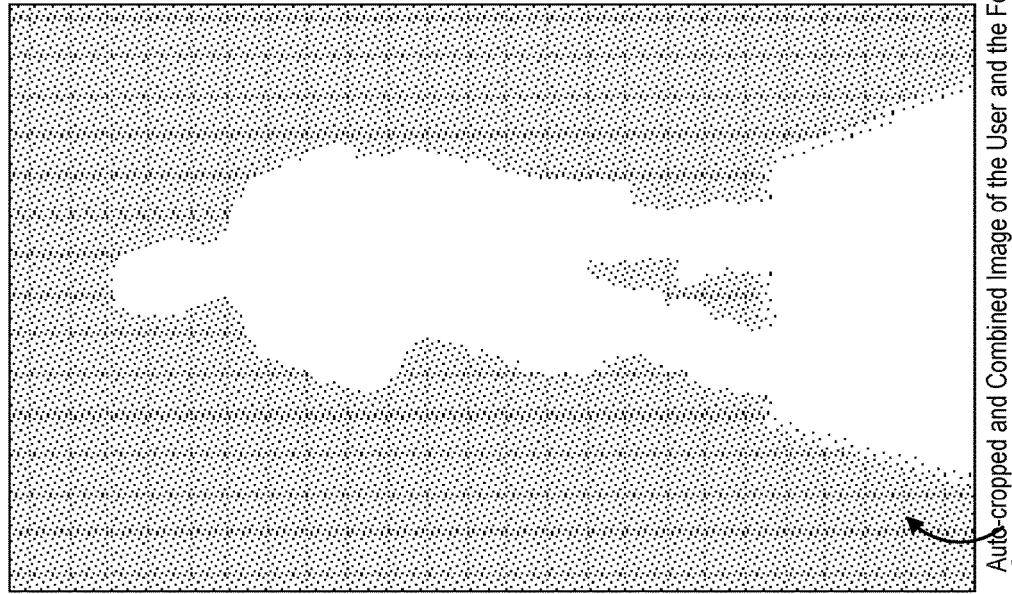
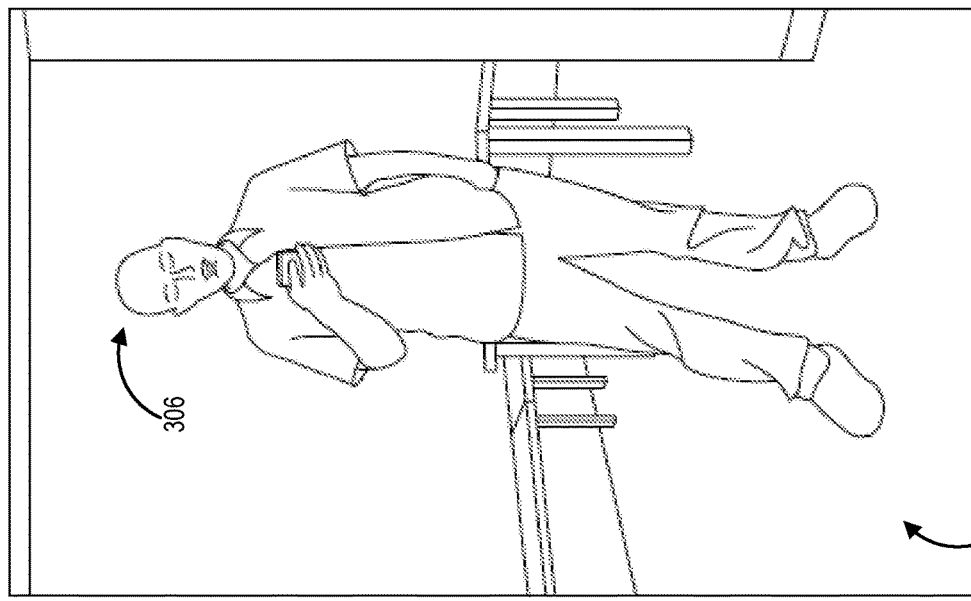
FIG. 3

INTELLIGENT AUTO-CROPPING OF IMAGES

BACKGROUND

Network-enabled devices allow people to perform a variety of functions that were previously only performed by a multitude of separate devices. For example, using a network-enabled device, a user may stream media such as music and movies, shop for items or services online, or play video games, activities that previously required the use of a radio, television, in person shopping, or a video game console, respectively. Users today can leverage the more technologically advanced devices to accomplish a number of goals such as having a larger social online presence by being more active with social media sites. For example, a user may post or provide information about where they are, what they are doing, or images of themselves. As users share more information, they may grow more self-conscious of how they look or what they are wearing. However, in today's busy world, it is difficult for users to accurately gauge how certain outfits looked, when a particular outfit was worn, and what composed a particular outfit if they wish to recreate a particular look or style. Current technologies are limited in capabilities to allow a user to recreate a particular look or style and this can be detrimental to their sharing of information and their social activity.

BRIEF DESCRIPTION OF THE DRAWINGS

Various embodiments in accordance with the present disclosure will be described with reference to the drawings, in which:

FIG. 3 illustrates examples of a mask image and a color image that have been auto-cropped according to the auto-crop feature described herein to generate a more centered and useful image for a user, in accordance with at least one embodiment;

DETAILED DESCRIPTION

Figure 1:
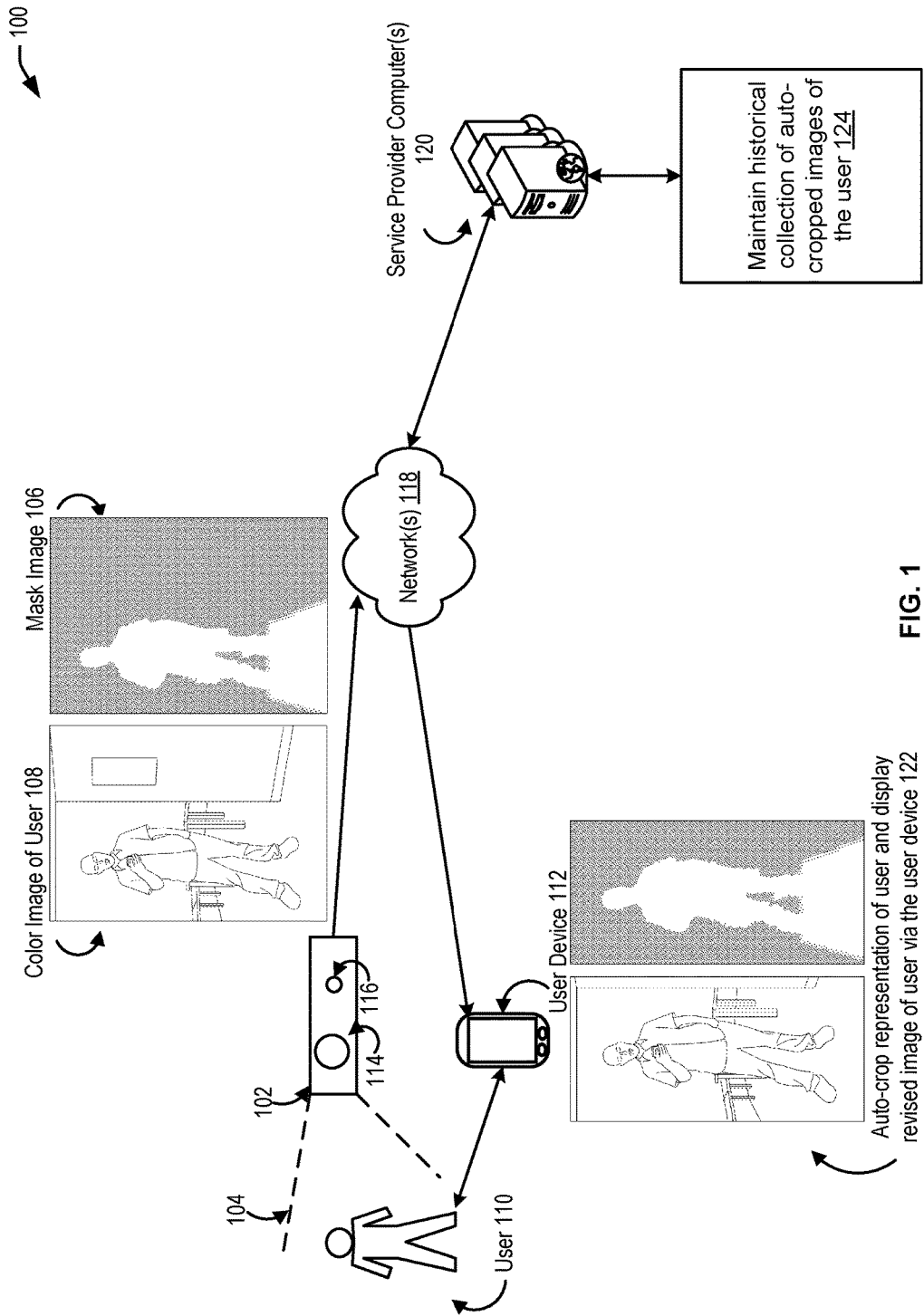
FIG. 1 illustrates an example workflow for an auto-crop service feature, in accordance with at least one embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described herein provide for an auto-crop feature that utilizes a mask and color image of a user (or any item, subject, etc.), that is captured by an image capture device, to intelligently and accurately crop (i.e., remove) extraneous regions around the user in the image and refocus the image so that the representation of the user in the revised or resultant image is in the foreground, centered, and presented with an increased clarity than other objects in the image, such as the background. In some examples, "auto-cropping" can be described as a computer-implemented operation that resizes or re-fits the contents of an image. As used herein, "crop" or "cropping" includes removing one or more areas of an image. In embodiments, auto-cropping can include cropping or removing extraneous regions of an image to better fit or resize a composition to fit a representation of a user in the image itself and may include adjusting an aspect ratio of the image. In accordance with at least one embodiment, the auto-crop feature may be implemented by a native application on a user's computer device (i.e., mobile phone, laptop, tablet computer, video game device, etc.,) that receives information from an image capture device to accurately auto-crop an image to present a properly sized and centered image of a user within the composition of the image. In some embodiments, a computer device may be associated with an image capture device and be configured to utilize the auto-crop feature described herein, in which case the relevant information required to auto-crop an image would be obtained rather than received by a separate image capture device. For example, the user device that is configured to utilize an application that implements the auto-crop feature may also be configured to utilize a depth sensor and color sensor for capturing and obtaining a mask image and a color image of a user.

In a non-limiting example, a user may position themselves in front of an image capture device to capture an image of themselves and the outfit they are currently wearing. As described herein, the image capture device may utilize a depth sensor to capture a depth image of the user and a color sensor to capture a color image of the user and generate metadata that identifies portions of the image as foreground, background, or foot or floor region. The mask, color image, and metadata may be transmitted, via an available network such as a wireless network, to the user's mobile phone. An application of the mobile phone may interpret the received information to remove certain portions of the image and auto-crop or fit a representation of the user and a floor or foot region within the composition of the unremoved portion of the image. The resultant or revised image may then be displayed to the user via a user interface of the mobile phone. As described herein, the user may interact with the user interface to view multiple auto-cropped images of themselves wearing various outfits, order or re-order items included in an outfit, or combine portions of images to generate a new outfit for comparison purposes.

In embodiments, an image capture device may include at least a depth sensor that is configured to capture depth information or a depth image of a user and a color sensor that is configured to capture a color image of the user. An example of an image capture device may include an Intel® SR 300 sensor that is configured to utilize a depth sensor to capture a three-dimensional (3D) image of a user and a red, green, and blue (RGB) camera to capture a color image of the user. The image capture device may be configured to utilize one or more software applications or algorithms implemented by the software algorithms to translate or convert the 3D image of the user in the depth image to a two-dimensional (2D) mask or mask image and generate metadata that identifies a relative depth of each pixel, an identification of foreground or background, and a color for each pixel of an image captured by the image capture device. In accordance with at least one embodiment, the image capture device may convert the 3D depth image to a 2D mask image using the color image as a reference and the detection of foreground objects versus background objects to extract a representation of the user from the color image. The image capture device may be configured to transmit the 2D mask image, the color image, and the metadata to a user's computer device where the native application may perform the auto-cropping and cropping features described herein utilizing the 2D mask image. In some embodiments, the image capture device and associated software applications or algorithms may generate a mask using the color image.

In accordance with at least one embodiment, the image capture device may be configured to identify or approximate a foot region of the user by marking certain portions of the image in the metadata as a floor or user foot region. Depth sensors often have problems identifying foreground and background objects near intersecting planes, such as a where user's feet intersect with a floor of a room. In embodiments, the image capture device is configured to assign unique values to pixels that fall within the intersecting planes (e.g., "user's foot region") that can be included in the metadata. The application that implements the auto-crop feature can interpret the metadata and intelligently combine other portions of the representation of the user (i.e., the user's head and body region) in the image with the foot or floor region of an image to create an accurate foreground representation of the user in a revised image. The auto-crop feature service described herein may include presenting or displaying a revised and auto-cropped image of a user to the user via their associated user device.

The application of the user device may be configured to perform a blurring operation, or other suitable obscuring operation to objects or pixels that are marked as background as identified by the metadata received from the image capture device. As such, the user is presented with an intelligently and accurately auto-cropped image of themselves that includes greater clarity, is accurately fitted or sized to the composition of the image, and blurs or removes background objects. The revised image that is presented to the user may be utilized to compare outfits previously worn by the user by comparing other previously captured and auto-cropped images. In embodiments, the auto-crop feature implemented by the application may maintain a historical catalog of captured and auto-cropped images of the user for use in comparing the outfits, to serve as a catalog of the user's wardrobe, and to mix and match outfits by removing portions of a user in an image and replacing it with other portions from other auto-cropped images. For example, a user may interact with a user interface to remove the leg region of their body and replace it with a leg region of another captured and stored image to compare how different pants or skirts would look with a certain shirt or blouse. In accordance with at least one embodiment, the application implementing the auto-crop feature may be configured to utilize an item recognition algorithm to identify one or more items included in the image of the user, such as a shirt, blouse, pants, skirt, hat, or shoes the user is wearing.

The native application may leverage a catalog of items maintained by an electronic marketplace with the item recognition algorithm to identify the items in the image and present an option or enable the user to purchase said items from the electronic marketplace. In some embodiments, the auto-crop feature service may generate item web page listings automatically upon detecting an item in an image for offering the item via an online marketplace or electronic marketplace. Suitable item recognition algorithms may include analyzing barcodes or labels associated with an item included in the image. The barcodes or labels included in the image may be matched against a barcode or label database to identify the item in the image. In some embodiments, an image may be analyzed via an algorithm to determine image characteristics for each item included in an image. Optical character recognition can be utilized to process labels or tags associated with an item in the image and matched to labels or tags of other items maintained in an item catalog. In embodiments, an image processing algorithm can fragment a picture into multiple portions and process each portion individually to identify items included in an image. In some implementations, a user can individually identify or tag regions or items included in the image to enable an algorithm to identify the items included in the image.

FIG. 1 illustrates an example workflow for an auto-crop service feature, in accordance with at least one embodiment. The workflow 100 of FIG. 1 includes an image capture device 102 capturing 104 (as indicated by the dashed lines) a depth image of the user, which can be utilized to generate mask image 106, and a color image 108 of a user 110. The user may interact with a user device 112 to begin the image capture process by the image capture device 102 or interact with the image capture device 102 directly to begin capturing images of the user 110. In accordance with at least one embodiment, the image capture device 102 may include a depth sensor 114 and a color sensor 116. In embodiments, the depth sensor 114 may be configured to capture a 3D depth image or depth information of user 110 which can be utilized to generate the mask image 106 using a software application and/or algorithm of image capture device 102. The color sensor 116 may be configured to capture a color image or RGB image (108) of the user 110. In embodiments, the image capture device may be configured to determine a depth for each pixel included in the color image 108, identify a pixel as in the foreground or background of the color image 108, and generate metadata that indicates the depth, foreground/background determination, and color of each pixel from the captured images 106 and 108. The image capture device 102 may be configured to convert the 3D depth image or depth information of user 110 to a 2D mask image (106) utilizing the color image 108 and the depth of each pixel and identification of foreground versus background objects as indicated by the metadata.

In workflow 100, the color image of the user 108, mask image 106, and metadata are transmitted, via networks 118, to user device 112. An application configured to run on the user device 112 may implement the auto-crop feature described herein. In some embodiments, the color image of the user 108, mask image 106, and the metadata are transmitted, via networks 118, to one or more service provider computers 120 for similar processing as the application on user device 112. As described herein, the application of user device 112 may extract a representation of the user, a floor region associated with the user, from the color image 108, remove one or more areas of the color image 108, combine the extracted representation of the user and the floor region to auto-crop, resize, or fit within the area not removed to better fit within the composition of the resultant image, and blur any remaining areas that are not indicated as foreground (i.e., background) based on the metadata. The workflow 100 depicts an example of the color image 108 and mask image 106 that has been auto-cropped to remove extraneous areas and recompose the representation of the user to be more centered and accurately portray the user at 122. The user device 112 may display, via a user interface, the revised image 122 to the user 110. In some embodiments, the revised image 122 may be transmitted, via networks 118, to the one or more service provider computers 120 for maintaining a historical collection of auto-cropped images of the user at 124.

In accordance with at least one embodiment, the user 110 may interact with user device 112 to scroll or browse through a plurality of other auto-cropped images of themselves to see how they looked in certain outfits, when certain outfits were worn, or to mix and match outfits by cutting and pasting portions of an image onto another image (e.g., remove a shirt and replace with a shirt from another auto-cropped image). In embodiments, the user device 112 and image capture device 102 may be associated with each other or include components of one another so that communication via networks 118 is unrequired. In accordance with at least one embodiment, the service provider computers 120 or user device 112 may be configured to identify objects or items in the auto-cropped image 122 to enable the user 110 to purchase, re-order, or list for offering to other users the identified items or objects.

Figure 2:
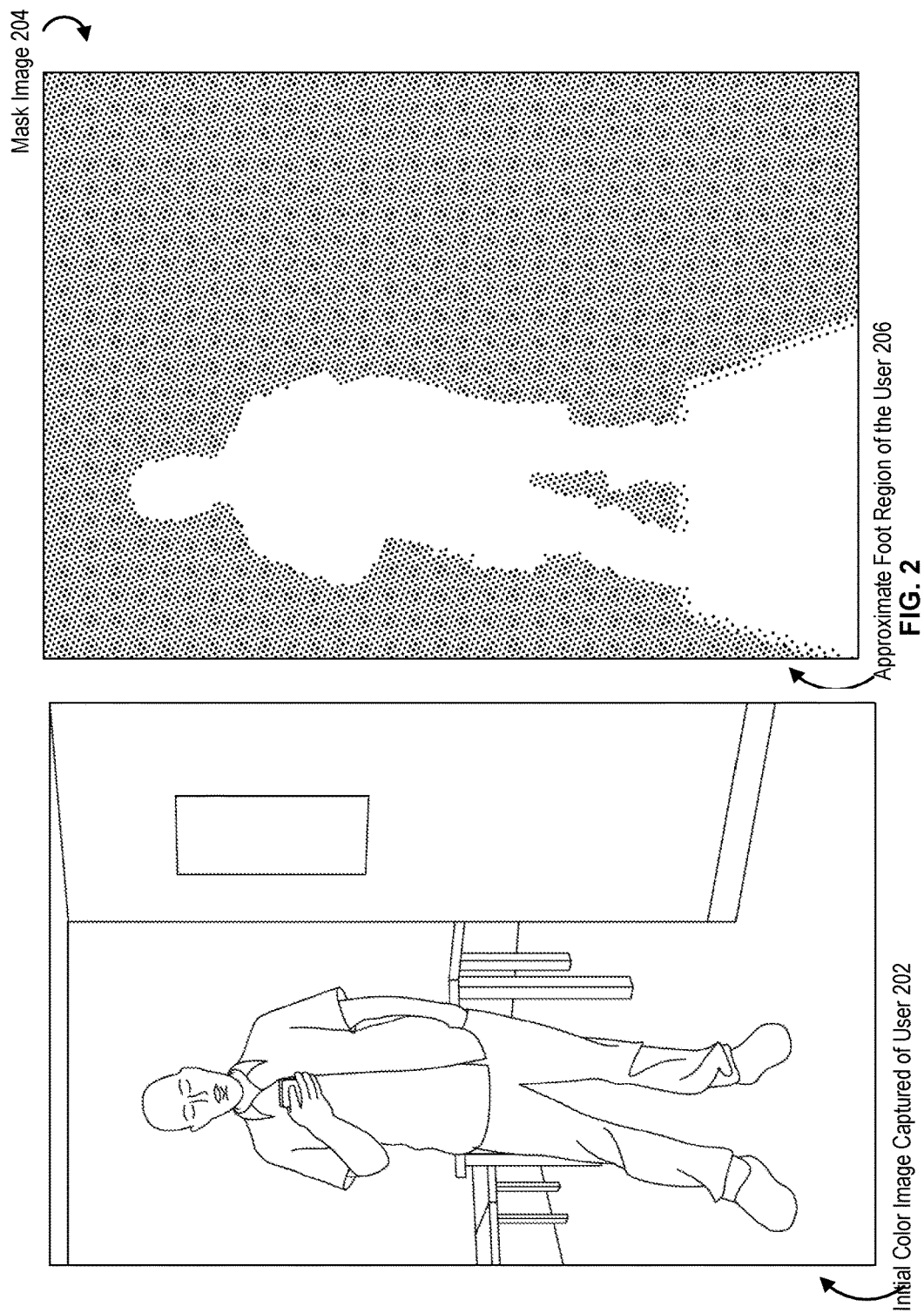
FIG. 2 illustrates examples of a mask image and a color image that are off-center and captured by an image capture device, in accordance with at least one embodiment.

FIG. 2 illustrates examples of a mask image and a color image that are off-center and captured by an image capture device, in accordance with at least one embodiment. FIG. 2 depicts an example of an initial color image captured of a user at 202 by an image capture device (102 of FIG. 1) and a mask image 204 of the user that is generated using depth image or depth information captured at the same time by the image capture device. As illustrated in FIG. 2, the initial color image captured of the user 202 is off center, includes areas of the background that are unnecessary, and the user is not the main focus or clear object of the image. FIG. 2 also illustrates the approximate foot region of the user 206. As described herein, the mask image 204 compensates for problems associated with intersecting planes when depth images are captured of intersecting planes, such as feet and the floor, by approximating a region around the user's feet and assigning particular values to the pixels in the approximate region that indicate the region as the foot region and to be included as foreground. In embodiments, the application implementing the auto-crop feature may intelligently and accurately combine the representation of the user, extracted using the mask image 204, and the approximate foot region of the user 206, from the color image 202. This extracted representation of the user and foot region combination can be utilized to auto-crop the initial color image 202 to better fit and resize the image within the composition of the image and generate a more centered and useful image of the user.

FIG. 3 illustrates examples of a mask image and a color image that have been auto-cropped according to the auto-crop feature described herein to generate a more centered and useful image for a user, in accordance with at least one embodiment. FIG. 3 includes the auto-cropped image of the user 302 and the auto-cropped and combined image of the user and foot region in mask image 304. As illustrated in FIG. 1 and again in FIG. 3, the representation of the user 306, has had certain areas removed from the initial color image 202 of FIG. 2 and has been auto-cropped to fit better within the composition of the area of the image in 302. FIG. 3 also illustrates the mask image of the combination of the approximate foot region and representation of the user at 304. As described herein, other portions of the auto-cropped image 302 may be blurred, according to a user preference. The mask image 304 allows for a tighter fit around the representation of the user within an image and thus a more accurate auto-crop that can remove a greater amount of extraneous areas and blurring of background details so that a clearer image of the user is presented via the user device.

Figure 4:
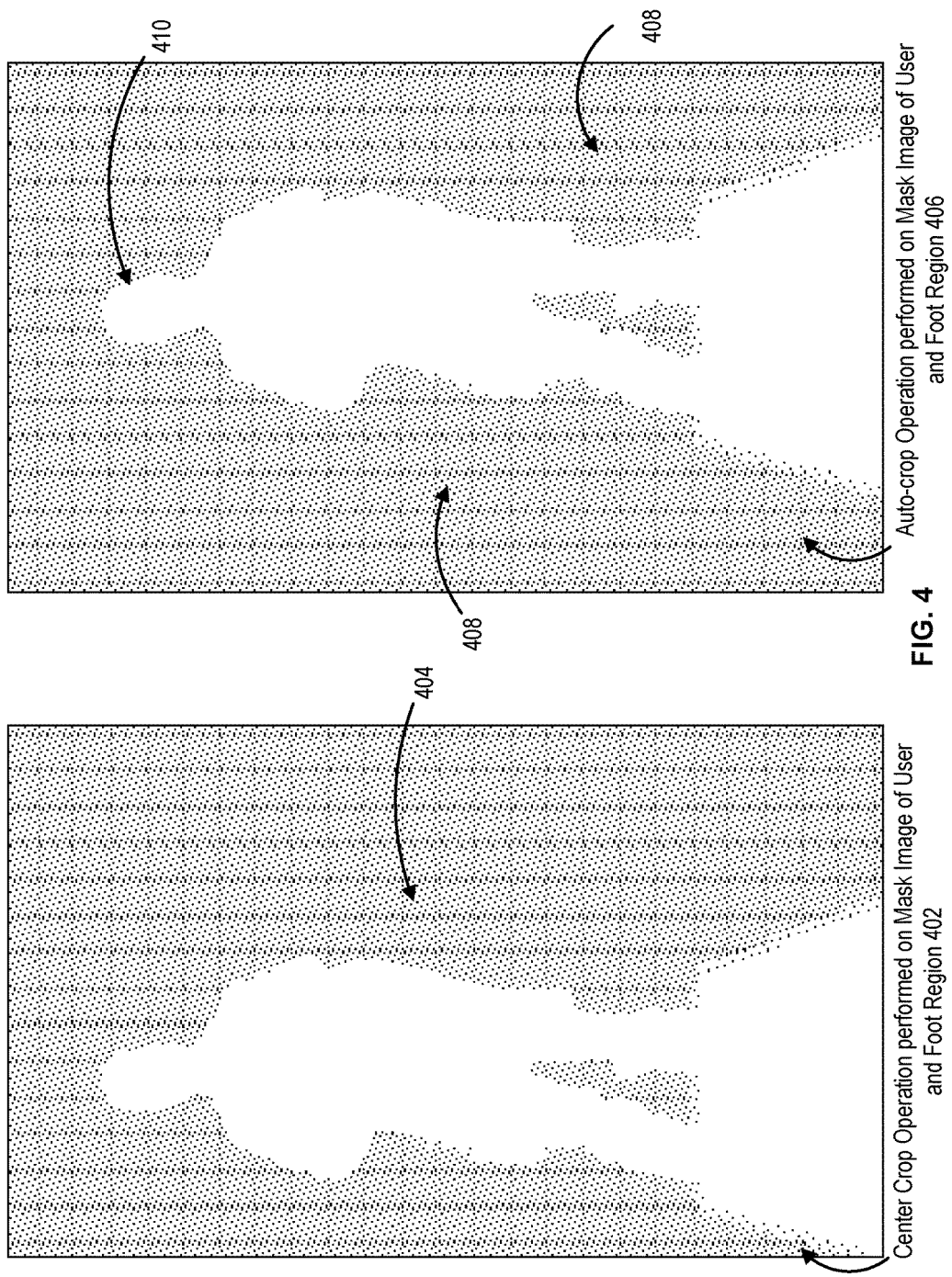
FIG. 4 illustrates examples of a center crop operation that is performed by conventional image processing applications and an auto-crop operation performed by the auto-crop feature described herein, in accordance with at least one embodiment.

FIG. 4 illustrates examples of a center crop operation that is performed by conventional image processing applications and an auto-crop operation performed by the auto-crop feature described herein, in accordance with at least one embodiment. FIG. 4 depicts an example of conventional auto-crop like features that perform an obtuse centering operation at 402. As depicted in the mask image that has had a center crop operation performed 402, there exists a large unrequired area 404 that results in an actual off-center view or representation of the user that is not useful for outfit comparison or for drawing a viewer's eye to the main subject of the image which is the user. To compare, the mask image 406 on the right hand side of FIG. 4 represents the auto-crop feature performed that is described herein. As illustrated in FIG. 4, the mask image 406 includes less empty space or unrequired space 408 on either side of the representation of the user 410. The auto-cropped image 406 draws the viewer's eye to the subject of the image which is the user while removing unrequired objects and items from either side and results in a truly centered image of the user within the composition of the initially captured image, such as image 202 of FIG. 2. In embodiments, the mask image 406 may be generated by the image capture device utilizing depth information captured by a depth sensor of the image capture device.

Figure 5:
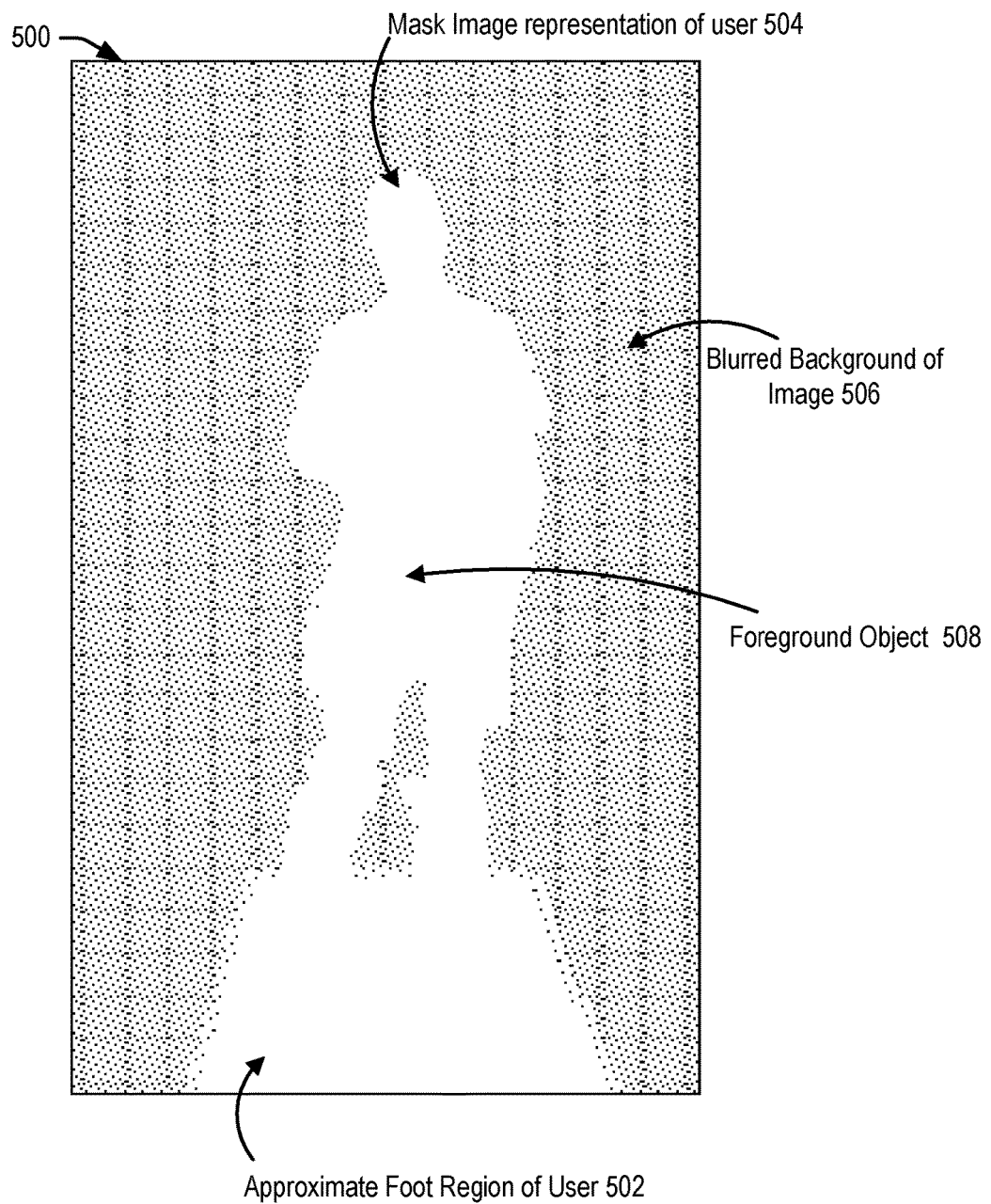
FIG. 5 illustrates an example mask that identifies foreground objects and background objects, in accordance with at least one embodiment.

FIG. 5 illustrates an example mask image that identifies foreground objects and background objects, in accordance with at least one embodiment. A mask image or image mask as used herein can refer to a mask generated by the image capture device using depth information captured by a depth sensor of the image capture device and utilized to extract a representation of the user from a color image also captured by the image capture device. The image mask or mask image may include a 2D image mask that is converted from a 3D depth image captured by the image capture device utilizing associated software applications or image conversion algorithms. FIG. 5 includes an auto-cropped operation, as described herein, performed on an initial image (such as image 202 of FIG. 2) that was captured by an image capture device. The revised image 500 is an example of an image mask with various regions of the image indicated such as the approximate foot region of the user 502, a mask image representation of the user 504, a blurred background of the image 506, and a foreground object 508 (such as user 110 of FIG. 1). In accordance with at least one embodiment, the image capture device may capture and identify one or more objects between the mask image representation of the user 504 and the image capture device 102 of FIG. 1. In such cases, instructions may be provided to the user, via user device 112, for removing the offending objects/items and recapturing an image of themselves. In some embodiments, if a portion of the user is obscured, instructions may be provided to the user for recapturing an image of themselves.

Figure 6:
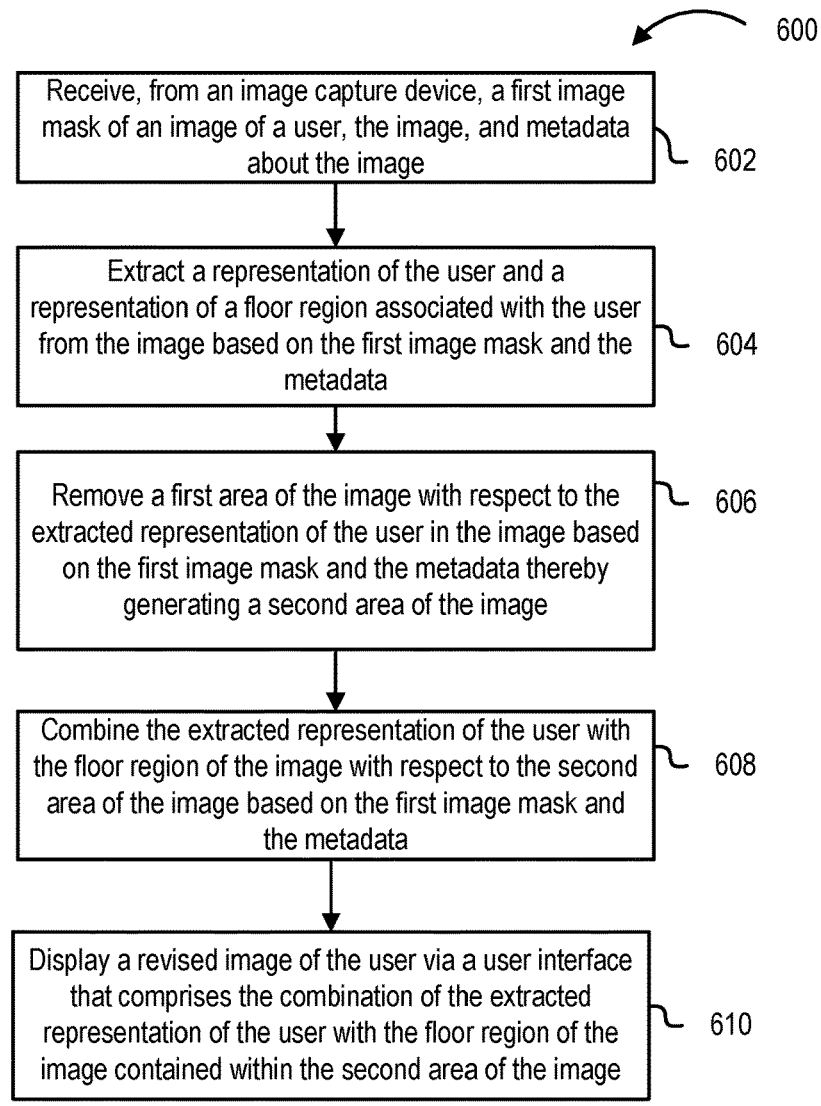
FIG. 6 illustrates an example flowchart for an auto-crop service feature, in accordance with at least one embodiment.
Figure 7:
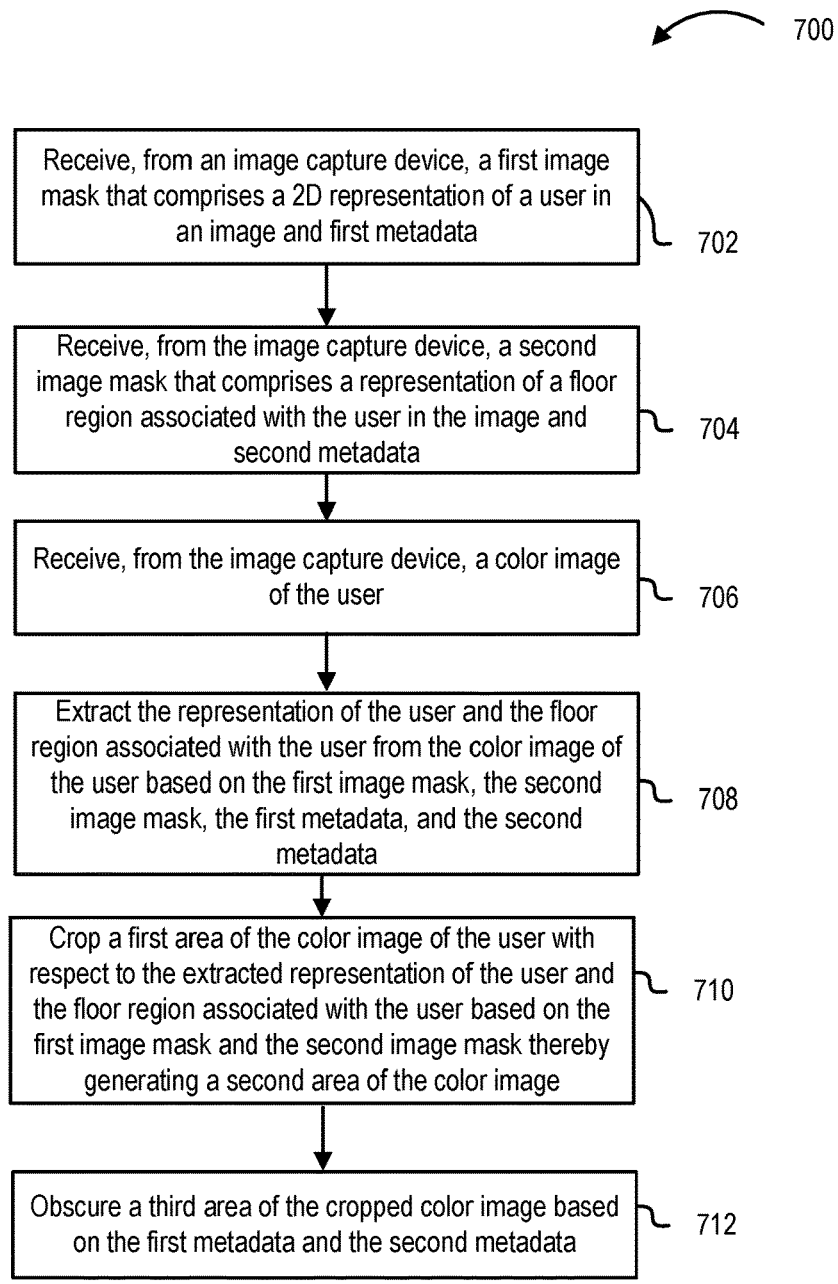
FIG. 7 illustrates an example flowchart for an auto-crop service feature, in accordance with at least one embodiment.

FIGS. 6 and 7 illustrate example flows for an auto-crop feature, according to embodiments. These processes are illustrated as a logical flow diagram, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer executable instructions include routines, programs, objects, components, data structures and the like that perform particular functions or implement particular data types. The order in which the operations are described is not intended to be construed as a limitation, and any number of the described operations can be combined in any order and or in parallel to implement the process.

Additionally, some, any, or all of the process (or any other processes described herein, or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. As noted above, the code may be stored on a computer-readable storage medium, for example, in the form of a computer program including a plurality of instructions executable by one or more processors. The computer-readable storage medium may be non-transitory.

Figure 8:
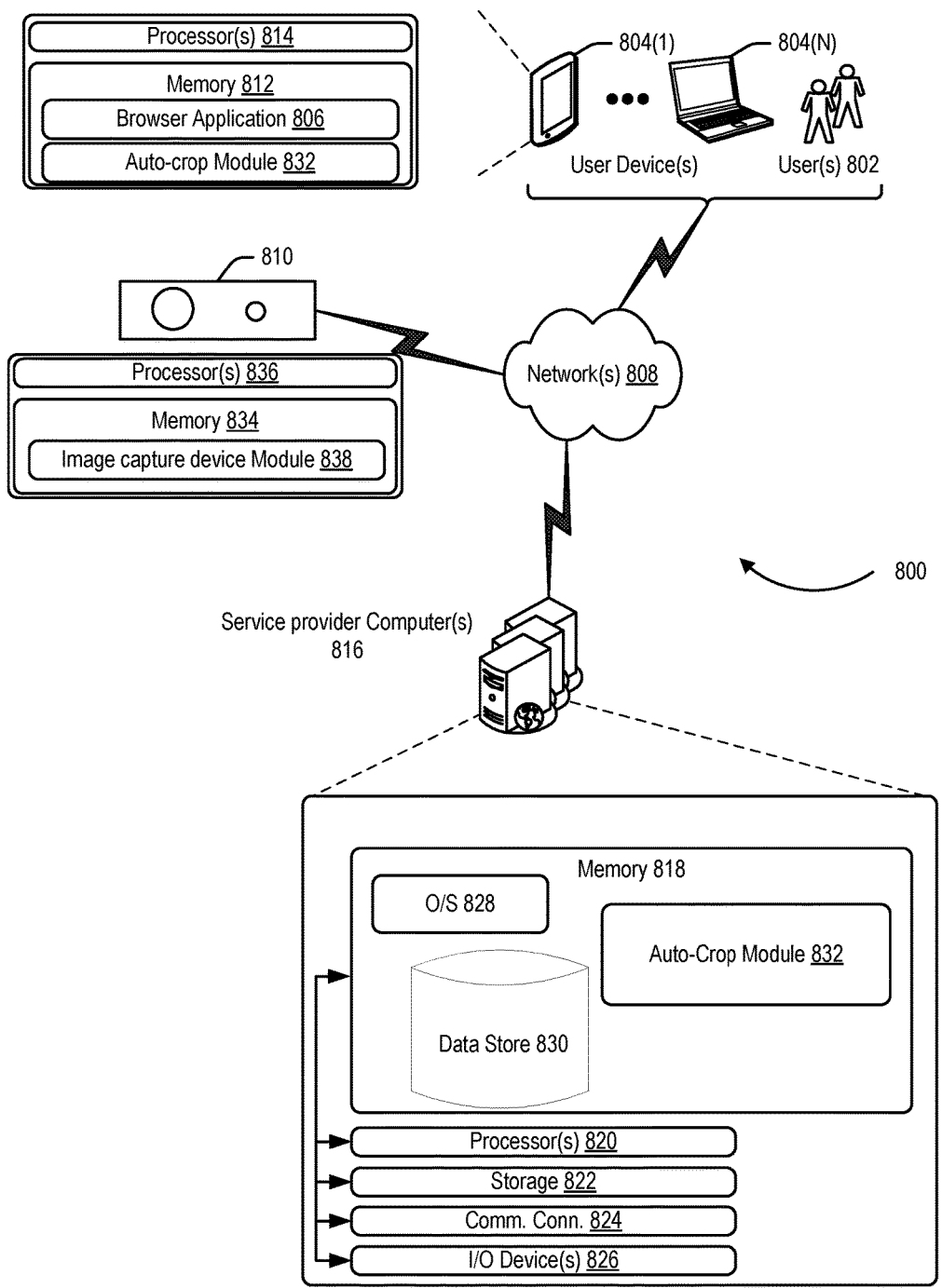
FIG. 8 illustrates an example architecture for implementing an auto-crop service feature that includes at least a user device, an image capture device, and one or more service provider computers, in accordance with at least one embodiment.

In some examples, the one or more service provider computers (one or more service provider computers 120 and 816) and/or the user devices 112 and 804 utilizing at least the auto-crop module 832 shown in FIGS. 1 and 8 may perform the processes 600 and 700 of FIGS. 6 and 7. In FIG. 6 the process 600 may include receiving, from an image capture device, a first image mask of an image of a user, the image, and metadata about the image at 602. In embodiments, the first image mask may be an example of a depth image mask. In accordance with at least one embodiment, the metadata may indicate a plurality of unique values for one or more portions included in the image and the image capture device may be configured to capture a mask image of the user and a color image of the user. The mask image of the user may include a 3D representation of the user that is used by the image capture device to identify a depth of the user and a foreground location of the user with respect to a background of the image captured by the image capture device. A color image may include an RGB image of the user and the first image mask may comprise the mask image and the color image.

The process 600 may include extracting a representation of the user and a representation of a floor region associated with the user from the image based on the first image mask and the metadata at 604. In embodiments, the representation of the user may include a first subset of portions of a plurality of portions included in the image and the representation of the floor region may include a second subset of portions of the plurality of portions included in the image. The process 600 may include removing a first area of the image with respect to the extracted representation of the user in the image based on the first image mask and the metadata thereby generating a second area of the image at 606. For example, the application implementing the auto-crop feature described herein may be configured to remove one or more areas of the image utilizing the known location of the user in the image and the identification of background objects areas as indicated by the metadata.

The process 600 may include combining the extracted representation of the user with the floor region of the image with respect to the second area of the image based on the first image mask and the metadata at 608. As described herein, the combining of the extracted representation of the user with the floor region of the image can aid in solving problems historically associated with depth images that attempt to capture depths or images at intersecting planes. A tighter fit of the user and the floor region can be accomplished by leveraging the area marked as the floor region and combining the area associated with the user to fit and auto-crop the combination of the representation of the user and the floor region within the composition of the area left after removing extraneous areas. The process 600 may conclude at 610 by displaying a revised image of the user via a user interface that comprises the combination of the extracted representation of the user with the floor region of the image contained within the second area of the image. In some embodiments, displaying of the revised image includes blurring or otherwise obscuring other areas of the image that are not the user (i.e., the background) so as to generate a more crisp image of the user without distracting images or details from the background.

The process 700 may include receiving, from an image capture device, a first image mask that comprises a 2D representation of a user in an image and first metadata at 702. In embodiments, the first metadata may identify a first subset of regions in the image as being in a foreground of the image. The process 700 may include receiving, from the image capture device, a second image mask that comprises a representation of a floor region associated with the user in the image and second metadata at 704. In embodiments, the second metadata may identify a second subset of regions in the image as the foreground of the image. The process 700 may include receiving, from the image capture device, a color image of the user at 706. In embodiments, the first image mask and second image mask may be captured by a depth sensor of the image capture device and the color image of the user may be captured by a color sensor of the image capture device. The process 700 may include extracting the representation of the user and the floor region associated with the user from the color image of the user based on the first image mask, the second image mask, the first metadata, and the second metadata at 708. As described herein, the extraction process may utilize the image masks and metadata to create a tighter fit of an area around the representation of the user and floor region with which to extract and utilize for cropping and auto-cropping purposes.

The process 700 may include cropping a first area of the color image of the user with respect to the extracted representation of the user and the floor region associated with the user based on the first image mask and the second image mask thereby generating a second area of the color image at 710. In accordance with at least one embodiment, an application configured to implement the auto-crop feature may be configured to remove one or more areas of an image that are not required for presenting a particular aspect ratio image of the user (e.g., extraneous areas of the image). In embodiments, the application may identify the extraneous areas by calculating a distance between the representation of the user within the image and an area in question within the image itself and a threshold. For example, an area that is a certain number of pixels away from the pixel that includes a representation of the user may be deemed extraneous and removed or cropped from a revised auto-cropped image of the user. The process 700 may conclude at 710 by obscuring a third area of the cropped color image based on the first metadata and the second metadata. In embodiments, the extracted representation of the user and the floor region associated with the user may be combined and fitted or resized so as to fit within the composition of the generated second area of the color image while all other portions (i.e., the third area) are obscured. In embodiments, a user may be instructed to remove intervening objects between the image capture device or to capture another image of themselves if one or more portions of the user are not present or are obstructed from the image capture device. Instructions may be transmitted to and presented by the application of the user device.

FIG. 8 illustrates an example architecture for implementing an auto-crop service feature that includes at least a user device, an image capture device, and one or more service provider computers, in accordance with at least one embodiment. In architecture 800, one or more users 802 (e.g., customers, users, etc.,) may utilize user computing devices 804(1)-(N) (collectively, user devices 804) to access a browser application 806 or a user interface (UI) accessible through the browser application 806, via one or more networks 808 to receive or communicate information to and from the image capture device 810 such as a mask image, a color image, metadata, or other suitable information to generating an auto-cropped image of a user captured by the image capture device 810 and presenting the revised image to the user 802 via user device 804. The "browser application" 806 can be any browser control or native application of user device 804 that can access and display a network page or other information such as a UI for a native software application for enabling the presentation of content or interaction with images displayed by the user device 804. A native software application may include an application or program that has been developed for use on a particular platform (such as an operating system) or a particular device (such as a particular type of mobile device or user device 804). In embodiments, the image capture device 810 may include one or more components (e.g., depth sensor, color sensor, camera, video recorder, video stream capture device, etc.,) for capturing a depth image and a color image of user 802.

The user devices 804 may include at least one memory 812 and one or more processing units or processor(s) 814. The memory 812 may store program instructions that are loadable and executable on the processor(s) 814, as well as data generated during the execution of these programs. Depending on the configuration and type of the user devices 804, the memory 812 may be volatile (such as random access memory (RAM)) and/or non-volatile (such as read-only memory (ROM), flash memory, etc.). The user devices 804 may also include additional removable storage and/or non-removable storage including, but not limited to, magnetic storage, optical disks, and/or tape storage. The disk drives and their associated non-transitory computer-readable media may provide non-volatile storage of computer-readable instructions, data structures, program modules, and other data for the user devices 804. In some implementations, the memory 812 may include multiple different types of memory, such as static random access memory (SRAM), dynamic random access memory (DRAM), or ROM.

Turning to the contents of the memory 812 in more detail, the memory 812 may include an operating system and one or more application programs or services for implementing the features disclosed herein. Additionally, the memory 812 may include one or more modules for implementing the features described herein including the auto-crop module 832.

The architecture 800 may also include one or more service provider computers 816 that may, in some examples, provide computing resources such as, but not limited to, client entities, low latency data storage, durable data storage, data access, management, virtualization, hosted computing environment or "cloud-based" solutions, electronic content performance management, etc. The one or more service provider computers 816 may implement or be an example of the service provider computer(s) 1XX of FIG. 1. The one or more service provider computers 816 may also be operable to provide site hosting, computer application development, and/or implementation platforms, combinations of the foregoing, or the like to the one or more users 802.

In some examples, the networks 808 may include any one or a combination of many different types of networks, such as cable networks, the Internet, wireless networks, cellular networks and other private and/or public networks. While the illustrated example represents the users 802 communicating with the image capture device 810 and the service provider computers 816 over the networks 808, the described techniques may equally apply in instances where the users 802 interact with the image capture device 810 or one or more service provider computers 816 via the one or more user devices 804 over a landline phone, via a kiosk, or in any other manner. It is also noted that the described techniques may apply in other client/server arrangements (e.g., set-top boxes, etc.), as well as in non-client/server arrangements (e.g., locally stored applications, peer-to-peer arrangements, etc.).

The one or more service provider computers 816 may be any type of computing device such as, but not limited to, a mobile phone, a smart phone, a personal digital assistant (PDA), a laptop computer, a desktop computer, a server computer, a thin-client device, a tablet PC, etc. Additionally, it should be noted that in some embodiments, the one or more service provider computers 816 may be executed by one or more virtual machines implemented in a hosted computing environment. The hosted computing environment may include one or more rapidly provisioned and released computing resources, which computing resources may include computing, networking, and/or storage devices. A hosted computing environment may also be referred to as a cloud computing environment or distributed computing environment. In some examples, the one or more service provider computers 816 may be in communication with the user device 804 and the image capture device 810 via the networks 808, or via other network connections. The one or more service provider computers 816 may include one or more servers, perhaps arranged in a cluster or as individual servers not associated with one another.

In one illustrative configuration, the one or more service provider computers 816 may include at least one memory 818 and one or more processing units or processors(s) 820. The processor(s) 820 may be implemented as appropriate in hardware, computer-executable instructions, firmware, or combinations thereof. Computer-executable instruction or firmware implementations of the processor(s) 820 may include computer-executable or machine-executable instructions written in any suitable programming language to perform the various functions described when executed by a hardware computing device, such as a processor. The memory 818 may store program instructions that are loadable and executable on the processor(s) 820, as well as data generated during the execution of these programs. Depending on the configuration and type of the one or more service provider computers 816, the memory 818 may be volatile (such as RAM) and/or non-volatile (such as ROM, flash memory, etc.). The one or more service provider computers 816 or servers may also include additional storage 822, which may include removable storage and/or non-removable storage. The additional storage 822 may include, but is not limited to, magnetic storage, optical disks and/or tape storage. The disk drives and their associated computer-readable media may provide non-volatile storage of computer-readable instructions, data structures, program modules, and other data for the computing devices. In some implementations, the memory 818 may include multiple different types of memory, such as SRAM, DRAM, or ROM.

The memory 818, the additional storage 822, both removable and non-removable, are all examples of non-transitory computer-readable storage media. For example, computer-readable storage media may include volatile or non-volatile, removable or non-removable media implemented in any method or technology for storage of information such as computer-readable instructions, data structures, program modules, or other data. The memory 818 and the additional storage 822 are all examples of non-transitory computer storage media. Additional types of non-transitory computer storage media that may be present in the one or more service provider computers 816 may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, or any other medium which can be used to store the desired information and which can be accessed by the one or more service provider computers 816. Combinations of any of the above should also be included within the scope of non-transitory computer-readable media.

The one or more service provider computers 816 may also contain communication connection interface(s) 824 that allow the one or more service provider computers 816 to communicate with a data store, another computing device or server, user terminals and/or other devices on the networks 808. The one or more service provider computers 816 may also include I/O device(s) 826, such as a keyboard, a mouse, a pen, a voice input device, a touch input device, a display, speakers, a printer, etc.

Turning to the contents of the memory 818 in more detail, the memory 818 may include an operating system 828, one or more data stores 830, and/or one or more application programs or services for implementing the features disclosed herein including the auto-crop module 832. In accordance with at least one embodiment, the auto-crop module 832 may be configured to at least transmit receive a mask image, color image, and metadata from the image capture device 810, extract a representation of the user 802 from the color image utilizing the mask image and metadata, combine a user region of the representation of the user with a floor or foot region of the image, remove or crop portions of the image that are extraneous, and auto-crop or fit the representation of the user within the composition of the image for presentation to the user 802 via user device 804. The images may be analyzed to identify objects or items included in the image such as a t-shirt or a pair of pants the user is wearing. The auto-crop module 832 may be configured to generate and present to the user 802, via the user device 804, an option for ordering the identified items or generating item offering web pages to offer the items for sale in an electronic marketplace.

The image capture device 810 may include at least one memory 834 and one or more processing units or processor(s) 836. The memory 834 may store program instructions that are loadable and executable on the processor(s) 836, as well as data generated during the execution of these programs. Depending on the configuration and type of the image capture device 810, the memory 834 may be volatile (such as random access memory (RAM)) and/or non-volatile (such as read-only memory (ROM), flash memory, etc.). The image capture device 810 may also include additional removable storage and/or non-removable storage including, but not limited to, magnetic storage, optical disks, and/or tape storage. The disk drives and their associated non-transitory computer-readable media may provide non-volatile storage of computer-readable instructions, data structures, program modules, and other data for the image capture device 810. In some implementations, the memory 834 may include multiple different types of memory, such as static random access memory (SRAM), dynamic random access memory (DRAM), or ROM.

Turning to the contents of the memory 834 in more detail, the memory 834 may include an operating system and/or firmware for implementing the features disclosed herein. Additionally, the memory 834 may include one or more modules for implementing the features described herein including the image capture device module 838. In embodiments, the image capture device module 838 may be configured to capture a depth image or depth information about the user 802 and a color image of user 802 and generate unique values which identify a pixel of the image as either foreground, background, part of a user, part of a floor or foot region, as well as depth, and color that is stored as metadata. The image capture device module 838 may be configured to convert a 3D depth image of the user 802 to a 2D image mask or to generate an image mask using the depth image or depth information of user 802 as captured by the image capture device 810. The image capture device module 838 may communicate the mask image, color image, and metadata to the user device 804 via networks 808 and/or the service provider computers 816.

Figure 9:
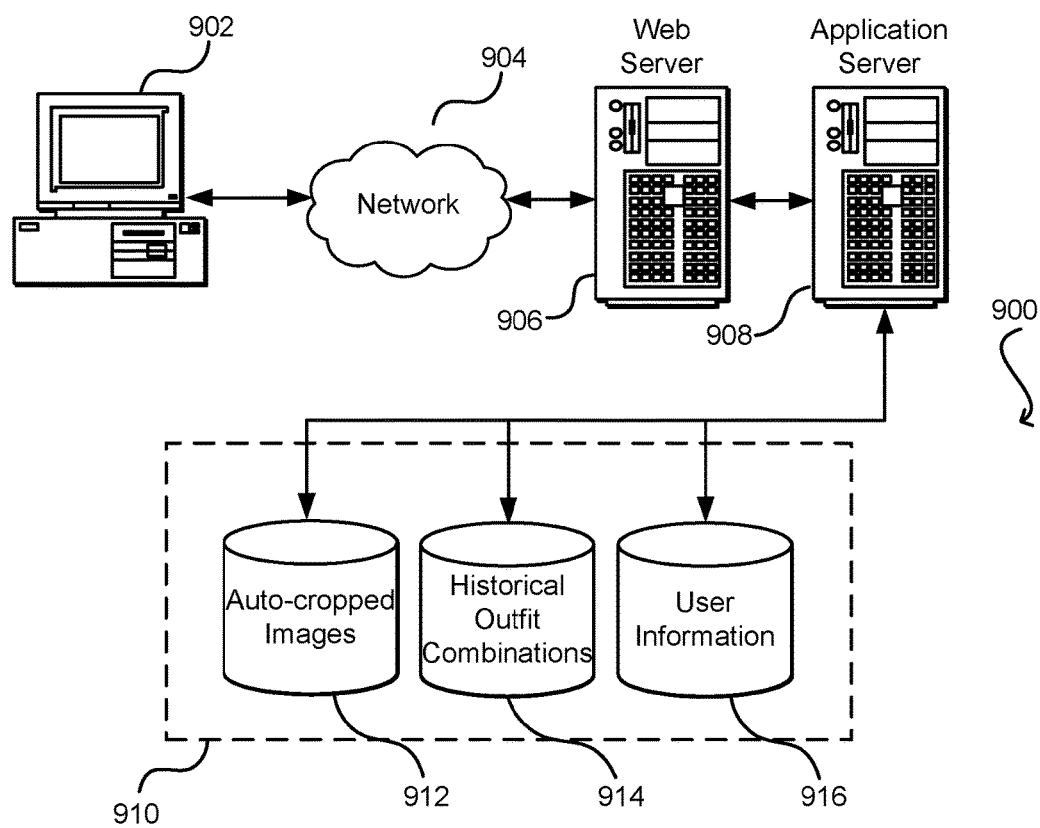
FIG. 9 illustrates an environment in which various embodiments can be implemented.

FIG. 9 illustrates aspects of an example environment 900 for implementing aspects in accordance with various embodiments. As will be appreciated, although a Web-based environment is used for purposes of explanation, different environments may be used, as appropriate, to implement various embodiments. The environment includes an electronic client device 902, which can include any appropriate device operable to send and receive requests, messages, or information over an appropriate network 904 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 906 for receiving requests and serving content in response thereto, although for other networks an alternative device serving a similar purpose could be used as would be apparent to one of ordinary skill in the art.

The illustrative environment includes at least one application server 908 and a data store 910. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio, and/or video to be transferred to the user, which may be served to the user by the Web server in the form of HyperText Markup Language ("HTML"), Extensible Markup Language ("XML"), or another appropriate structured language in this example. The handling of all requests and responses, as well as the delivery of content between the client device 902 and the application server 908, can be handled by the Web server. It should be understood that the Web and application servers are not required and are merely example components, as structured code discussed herein can be executed on any appropriate device or host machine as discussed elsewhere herein.

The data store 910 can include several separate data tables, databases or other data storage mechanisms and media for storing data relating to a particular aspect. For example, the data store illustrated includes mechanisms for storing auto-cropped images 912 for each particular user of the service and user information 916, which can be used to serve content for the production side and/or recommend items and outfits for the user to utilize. The data store also is shown to include a mechanism for storing historical outfit combinations 914, which can be used for reporting, analysis, or other such purposes such as recommending outfits, items to order, or services to utilize. It should be understood that there can be many other aspects that may need to be stored in the data store, such as for page image information and to access right information, which can be stored in any of the above listed mechanisms as appropriate or in additional mechanisms in the data store 910. The data store 910 is operable, through logic associated therewith, to receive instructions from the application server 908 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 902. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 9. Thus, the depiction of the system 900 in FIG. 9 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk®. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C#, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
   receiving, by a computer system and from an image capture device, a first image mask that comprises a two-dimensional (2D) representation of a user in an image captured by the image capture device and first metadata that identifies a first subset of regions in the image as being in a foreground of the image;
   receiving, by the computer system and from the image capture device, a second image mask that comprises a representation of a floor region associated with the user in the image captured by the image capture device and second metadata that identifies a second subset of regions in the image as the foreground of the image;

receiving, by the computer system and from the image capture device, a color image of the user;

extracting, by the computer system, the representation of the user and the floor region associated with the user, from the color image of the user, based at least in part on the first image mask, the second image mask, the first metadata, and the second metadata;

cropping, by the computer system, a first area of the color image of the user with respect to the extracted representation of the user and the floor region associated with the user based at least in part on the first image mask and the second image mask thereby generating a second area of the color image; and obscuring, by the computer system, a third area of the cropped color image based at least in part on the first metadata and the second metadata thereby generating a revised color image of the user that comprises a combination of the extracted representation of the user and the floor region associated with the user.

2. The computer-implemented method of claim 1, further comprising maintaining a plurality of cropped color images of the user.

3. The computer-implemented method of claim 1, further comprising identifying a plurality of items included in the image of the user based at least in part on an item recognition algorithm and an item catalog.

4. The computer-implemented method of claim 3, further comprising generating one or more item listing web pages for offering the identified plurality of items included in the image.

5. The computer-implemented method of claim 1, wherein receiving the color image of the user includes receiving third metadata that identifies a third subset of regions in the image as a background of the image.

6. The computer-implemented method of claim 5, wherein the first metadata, the second metadata, and the third metadata further identify a respective depth measurement for each pixel within the image captured by the image capture device.

7. The computer-implemented method of claim 1, wherein the image capture device comprises a depth sensor for capturing a three-dimensional (3D) image of the user and is further configured to convert the 3D image of the user to the 2D representation of the user using the color image of the user.

8. A computer system, comprising:
a memory that stores computer-executable instructions;
a first sensor configured to capture a three-dimensional (3D) image of an object;
a second sensor configured to capture a color image of the object; and
at least one processor configured to access the memory and execute the computer-executable instructions to collectively:
obtain a first image mask that comprises a two-dimensional (2D) representation of a user in an image captured by the first sensor and first metadata that identifies a first subset of regions in the image as being in a foreground of the image based at least in part on a 3D image of the image captured by the first sensor;
obtain a second image mask that comprises a representation of a floor region associated with the user in the image captured by the first sensor and second metadata that identifies a second subset of regions in the image as the foreground of the image;
obtain the color image of the user from the second sensor;
extract the representation of the user and the floor region associated with the user, from the color image of the user, based at least in part on the first image mask, the second image mask, the first metadata, and the second metadata; and
remove a first area of the color image of the user with respect to the extracted representation of the user and the floor region associated with the user based at least in part on the first image mask and the second image mask thereby generating a second area of the color image.

9. The computer system of claim 8, wherein the at least one processor is further configured to display a revised image of the user that comprises a combination of the extracted representation of the user and the floor region associated with the user within the second area of the color image.

10. The computer system of claim 8, wherein the at least one processor is further configured to obscure a third area of the color image based at least in part on the first metadata and the second metadata.

11. The computer system of claim 8, wherein obtaining the first image mask includes converting a 3D image of the user to a 2D image of the user.

12. The computer system of claim 8, wherein the at least one processor is further configured to identify one or more objects in the image based at least in part on an item recognition algorithm.

13. The computer system of claim 12, wherein the at least one processor is further configured to transmit instructions to the user for removing the identified one or more objects from the first subset of regions in the image.

14. The computer system of claim 12, wherein the at least one processor is further configured to transmit instructions to the user for capturing another image of the user in response to an indication that the identified one or more objects have been removed from the first subset of regions in the image.

* * * * *